United States Patent
May-Weymann et al.

(10) Patent No.: US 9,497,631 B1
(45) Date of Patent: Nov. 15, 2016

(54) AUTHENTICATION COMMANDS

(71) Applicant: Nvidia Corporation, Santa Clara, CA (US)

(72) Inventors: Alexander May-Weymann, Sophia Antipolis (FR); Flavien Delorme, Sophia Antipolis (FR); Jaafar Ben Younes, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/701,979

(22) Filed: May 1, 2015

(51) Int. Cl.
*H04W 12/06* (2009.01)
*H04W 76/02* (2009.01)

(52) U.S. Cl.
CPC ........... *H04W 12/06* (2013.01); *H04W 76/025* (2013.01)

(58) Field of Classification Search
CPC ............................ H04W 12/06; H04W 76/025
See application file for complete search history.

(56) References Cited

U.S. PATENT DOCUMENTS

| | | | | |
|---|---|---|---|---|
| 2006/0094462 A1* | 5/2006 | Nguyen | ............... | H04W 88/02 455/556.1 |
| 2012/0249720 A1* | 10/2012 | Ge | ................... | H04M 7/0039 348/14.02 |
| 2013/0095794 A1* | 4/2013 | Lhamon | ................ | H04W 12/06 455/411 |
| 2015/0281960 A1* | 10/2015 | Keisala | ................ | H04W 12/06 726/7 |
| 2016/0072783 A1* | 3/2016 | Noldus | .................. | H04L 63/08 726/7 |

OTHER PUBLICATIONS

"Serial Asynchronous automatic dialling and control," International Telecommunication Union, Series V: Data Communication Over the Telephone Network Control Procedures, V.250, Jul. 2003, 106 pages.

"3rd Generation Partnership Project; Technical Specification Group Core Network and Terminals; Characteristics of the IP Multimedia Services Identity Module (ISIM) application (Release 12)," 3GPP TS 31.103, V12.2.0, Jul. 2, 2014, 44 pages.

(Continued)

*Primary Examiner* — Brandon Miller

(57) ABSTRACT

This disclosure presents a modem for use at a terminal for accessing first and second communication networks that comprises a device interface for connecting to a subscriber identity device that stores first and second subscriber identity applications, and first and second pieces of user authentication data, separate from one another, for effecting independent first and second user authentication procedures for the first and second applications, respectively. A processing unit executes the first application to provide access to the first network when the first authentication procedure has been completed, and executes the second application to provide access to the second network when the second authentication procedure has been completed. An actuation component responds to an authentication command received via a host interface to identify at least one of the first and second pieces of user authentication data to perform an authentication task in relation to the identified user authentication data.

11 Claims, 6 Drawing Sheets

(56) References Cited

OTHER PUBLICATIONS

"3rd Generation Partnership Project; Technical Specification Group Core Network and Terminals; AT command set for User Equipment (UE) (Release 13)," 3GPP TS 27.007, V13.0.0, Mar. 20, 2015, 327 pages.

"3rd Generation Partnership Project; Technical Specification Group Core Network and Terminals; Characteristics of the Universal Subscriber Identity Module (USIM) application (Release 12)," 3GPP TS 31.102, V12.7.0, Mar. 27, 2015, 259 pages.

* cited by examiner

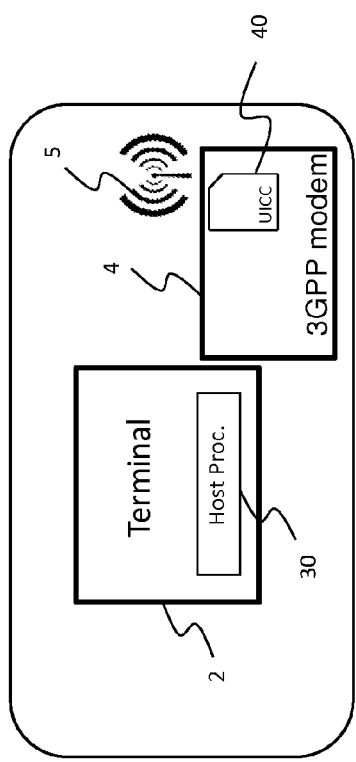
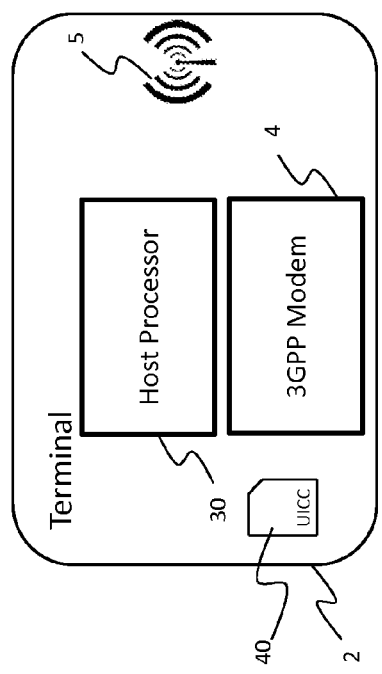
Figure 2A
Figure 2B

AUTHENTICATION COMMANDS

TECHNICAL FIELD

The present disclosure is directed, in general, to a modem and, more specifically, to a modem for use at a terminal for accessing first and second communication networks.

BACKGROUND

In a communication system, a device (typically a mobile device) termed user equipment (UE) communicates wirelessly with a radio access network. Communications between the UE and the radio access network may be effected in accordance with a multi-layered communications protocol. A modem is a device for transmitting and receiving signals in such a system and is used at the UE to communicate with the radio access network. A modem may be integrated in the UE or it may be not be integrated in the UE and may be connected to the UE via a suitable external interface (e.g. USB). In particular, a modem may be used at a UE to connect the UE to a public land mobile network (PLMN) such as a mobile cellular network (i.e. a 3GPP network or other CDMA network). The UE may comprise a "host" or "application" processor that communicates with the modem and causes it to perform desired tasks.

An example of a communication system is a 3GPP Universal Mobile Telecommunications System (UMTS) which is a cellular system comprising a collection of Node-Bs (base stations) and Radio Network Controllers (RNCs) controlling those Node-Bs. The Node-Bs and RNCs are collectively referred to as UTRAN ("Universal Terrestrial Radio Access Network"). A UMTS system may employ wideband code division multiple access (W-CDMA) radio access technology for communication between UEs and UTRAN.

A Universal Integrated Circuit Card (UICC) may be communicatively coupled to the modem. A UICC is a smart card (that is a physical card with embedded integrated circuits) comprising a CPU ("Central Processing Unit"), computer storage (e.g. ROM, RAM, EEPROM etc.) and input/output (I/O) circuits for communicating with the modem. Typically, the housing of a UE with an integrated modem or the housing of an external modem has a card slot which supports the UICC and communication between the modem and the UICC is effected by way of electrical pin connectors.

A UICC may store an application such as a Universal Subscriber Identity Module (USIM)—see e.g. 3GPP TS 31.102—which provides access to a UMTS network in the following manner. The USIM application is similar in some respects to the Subscriber Identity Module (SIM) application defined in GSM standards.

The USIM holds a unique International Mobile Subscriber Identifier (IMSI) and an associated unique authentication key K assigned by an operator of the network. Typically, the IMSI can be obtained via the UICC I/O, but not the key K which remains contained within the UICC. In order to gain access to the network, the IMSI is transmitted to the network. In response, the network generates a random number RAND which it sends to the UE and also signs with the key K, generating a first value. Once received, RAND is passed to the USIM application which signs it with the key K, generating a second value. The second value is returned to the network and, if the received second value matches the first value generated by the network, access to the network is granted, e.g. thereby enabling the UE to establish calls, transfer data etc.

The USIM application may be secured by a PIN ("Personal Identification Number") code. Before the IMSI can be obtained, the correct PIN (i.e. matching PIN data stored at the UICC) may have to be passed to the UICC for verification. The user may enter the PIN e.g. to a keypad or touchscreen of the UE.

Communication between the host and the modem can be implemented using protocols provided by the 3GPP specifications. In particular, communication between the modem and the host can be effected using an attention (AT) command port. For instance, the host processor may assert a particular AT command to cause the modem to perform a desired operation. AT commands form part of the "Hayes command set" modem command language, a high-level command language for effecting modem tasks see e.g. International Telecommunication Union (ITU-T) Rec. V.250 (07/2003). The command set comprises a set of short text strings (comprised of one or more characters, typically coded as ASCII characters) which can be combined to form complete commands for modem operations such as call establishment/termination, connection management and other functions operation e.g. SMS operations. An AT command c is typically delivered to the modem preceded by the characters "at" or "AT" to indicate to the modem that c is an AT command. AT commands constitute a software interface between the host and the modem.

Currently a "+CPIN" AT command (see e.g. 3GPP TS 27.007) is used to enter the PIN code for a 2G SIM/3G USIM application. Specifically, a command "AT +CPIN=<pin>" may be used to deliver an input PIN "<pin>" to the USIM e.g. as part of a user authentication procedure.

A counter at the UICC records the number of times an incorrect PIN value has been entered, representing a failed attempt to enter the PIN. If the total number of sequential failed attempts reached a threshold (e.g. three attempts), the PIN may be "locked". In practice, the UICC may implement a counter representing the number of remaining attempts before the PIN is locked which is decremented in the event of a failed attempt. Once the PIN is locked, the USIM application cannot be enabled even if the correct PIN is entered until a correct Pin Unlock Code (PUK) is received; a command "AT +CPIN=<pin>,<newpin>" may be used to reset the PIN code by providing the PUK code "<pin>" (current PUK) and set it to "<newpin>" (desired new PIN). However, if the correct PIN is entered before reaching the threshold, the USIM is enabled and the counter reset.

In response to a command "AT +CPIN?", the modem obtains a current status PIN status from the UICC e.g. one of "READY" indicating that the correct PIN has been received (thereby enabling the USIM application), "SIM PIN" indicating that the correct PIN has not been received (and that the USIM application is not yet enabled), or "SIM PUK" indicating that one or multiple UICC applications (e.g. USIM application(s)) is/are locked (e.g. because three incorrect PINs have been entered sequentially). A response "+CPIN:<code>" is returned by the modem to the host with the <code> parameter indicating the current PIN status (e.g. <code> may be one of READY, SIM PIN, or SIM PUK).

A command "AT+CPINR" directed to the modem causes the modem to obtain the remaining PIN entries—that is, the number of times that an incorrect PIN can be entered before the USIM is locked (e.g. 3, 2, 1 or 0) as well as the PIN status (<code>—see above), and the default (maximum, e.g. 3) number of retires permitted (<default_retries>). In response to receiving the "AT+CPINR" command, a "+CPINR: <code>,<retries>,<default_retries>" is duly returned to the host by the modem.

A command "AT +CPWD" can be used to change various passwords of the USIM, including the PIN—specifically, a command
"AT +CPWD=<fac>,<oldpwd>,<newpwd>"
where "<fac>" indicates which password is being changed, "<oldpwd>" is the current value of that password, and "<newpwd>" is the new desired value of that password. Thus "AT +CPWD" may be used to change the PIN used to access the USIM application. The parameter <fac> can take one of the following values:
"PS" Phone to SIM Lock
"SC" SIM Lock (PIN1)
"PN" Network Personalization
"PU" Network Subset Personalization
"PP" Service Provider Personalization
"PC" Corporate Personalization
with <fac>=SC being employed in the present context.

A command "AT +CLCK" can be used to enable or disable the PIN check (i.e. to change whether or not a PIN is required before access to the USIM will be granted). Specifically, a command "AT +CLCK=<fac>,<mode>, <passwd>" with <fac> being a particular one of the above-listed passwords (SC in this case); <mode>=0 enabling that password check, <mode>=1 disabling that password check, and <mode>=2 querying whether or not that password is currently enabled; and <passwd> being the current PIN code needed when <mode>=0 and <mode>=1.

SUMMARY

In one embodiment, this disclosure presents a modem for use at a terminal for accessing first and second communication networks. In this aspect, the modem comprises a device interface for connecting to a subscriber identity device. The subscriber identification device comprises computer storage storing first and second subscriber identity applications, and first and second pieces of user authentication data, separate from one another, for effecting independent first and second user authentication procedures for the first and second applications respectively. A processing unit is also present in this embodiment. The processing unit is operable to execute the first application to provide access to the first network when the first authentication procedure is completed, and to execute the second application to provide access to the second network when the second authentication procedure is completed. The modem further comprises a host interface for connecting to a host processor of the terminal, and an actuation component configured responsive to an authentication command received via the host interface. The actuation component has an attribute that identifies at least one of the first and second pieces of user authentication data to actuate the processing unit of the subscriber identification device to perform an authentication task in relation to the identified user authentication data.

According to one embodiment, the actuation component is configured responsive to a first authentication command to actuate the processing unit to perform an authentication task in relation to the first authentication data, and responsive to a second authentication command different form the first and having an attribute identifying the second authentication data to perform that same authentication task but in relation to the identified second authentication data.

According to one embodiment, the first command is received as a first string of characters and the second string is received as a second string of characters, the second string of characters being the same as the first string of characters but for at least one additional character not present in the first string, the at least one additional character being the attribute identifying the second authentication data.

According to one embodiment, the at least one additional character forms part of a preamble of the second command.

According to one embodiment, the authentication command has a parameter identifying one of the first and second pieces of user authentication data.

According to one embodiment, the authentication command has a preamble which does not identify either of the first and second pieces of user authentication data.

According to one embodiment, a parsing component is configured to receive the authentication command as a string of characters and to parse those characters to map the received command to a modem task to be performed by the modem, the actuation component being configured to perform the modem task by actuating the processing unit to perform the authentication task.

According to one embodiment, the parsing component is configured to perform said parsing to identify the at least one of the first and second pieces of user authentication data, the actuation component being configured to perform the authentication task in relation to the user authentication data identified by the parsing component.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a better understanding of the present subject matter and to show how the same may be carried into effect, reference will now be made to the following drawings in which:

FIG. 2A is a schematic illustration of a first configuration of a user equipment;

FIG. 2B is a schematic illustration of a second configuration of a user equipment;

DETAILED DESCRIPTION

Figure 1:
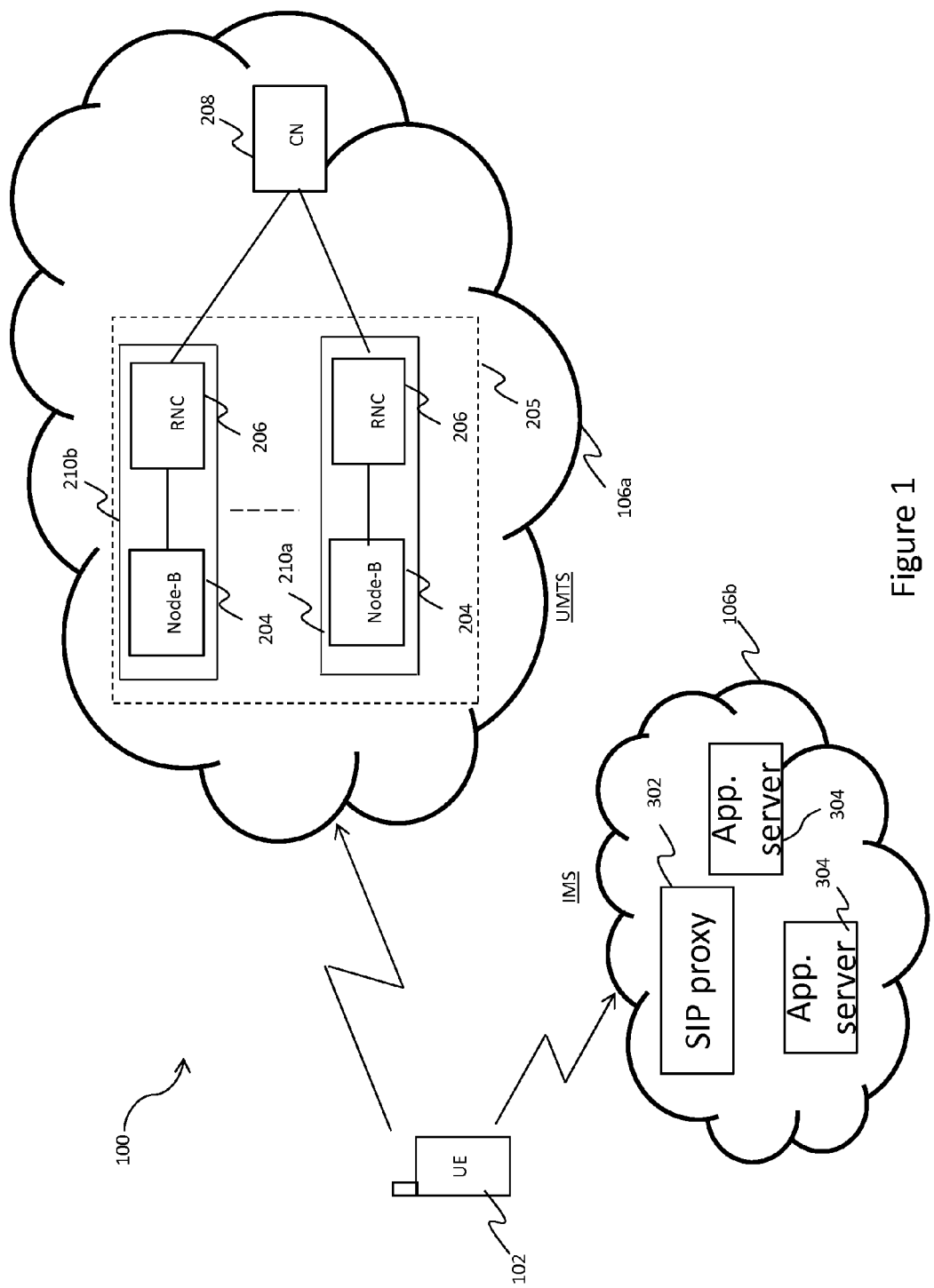
FIG. 1 is a schematic illustration of a communication system.

A UICC card can contain multiple applications. Besides the USIM application (3GPP TS 31.102), the UICC may also contain, for instance, an ISIM ("IP Multimedia Services Identity Module") application (see e.g. 3GPP TS 31.103) needed in LTE to access an IMS ("IP Multimedia Subsystem") network. That is, the different applications are for accessing different networks using different radio access technologies (RATS).

Both applications may be secured by a PIN code. This could be a "universal PIN" or the same "global key reference" referencing one of a number of "global PINs", both defined in ETSI TS 102 221 (see e.g. section 9), which would allow the two applications to be enabled with the same PIN code. That is, both the universal PIN and the global PINs can be used to secure multiple UICC applications i.e. each of those applications is useable once the correct universal/global PIN has been entered, none are useable before the correct universal/global PIN has been entered and all are locked after a threshold number of sequentially-entered incorrect universal/global PINS. Information about each PIN—such the status of that pin (READY, SIM PIN, SIM PUK), number of failed/remaining attempts—may be maintained and stored at the UICC in the manner described above.

In case the universal PIN is used, a simple "AT+CPIN" will start up the USIM and the ISIM (provided the universal PIN is entered correctly). "AT+CPINR" will return the remaining PIN entries (applicable to both the USIM and the ISIM). "AT+CLCK" can be used to (de)activate the PIN check (for both the USIM and the ISIM). "AT+CPWD" can be used to modify the (shared) universal PIN code.

In case the same global key reference is used, a simple AT+CPIN will, again, start up the USIM and the ISIM. AT+CPINR will return the remaining PIN entries (again applicable to both). AT+CLCK can be used to (de)activate the PIN check (again, for both). AT+CPWD can be used to modify the (shared) global PIN code.

However, the present disclosure considers a situation in which two or more smart card applications are secured using different PIN codes. That is, in which a first application is enabled by entering a first PIN code which is verified against first PIN data stored at the UICC as part of a first user authentication procedure, and a second application is enabled by entering a second PIN code which is verified against second PIN data stored separately from the first PIN data at the UICC as part of a second user authentication process independent from the first user authentication procedure (independent in that the first and second applications can be e.g. enabled, disabled and locked independently from one another). For instance, this is the case for two applications (e.g. USIM, ISIM) using use different global key references.

As indicated, currently the "AT+CPIN" command (3gpp TS 27.007) is used to enter the PIN code for the 2G SIM/3G USIM application. However, the disclosure recognizes that there is currently no AT command for giving the PIN code for the ISIM application in the scenario outlined above (i.e. when the ISIM and USIM applications use separate PINs e.g. where the applications do not use a universal PIN but instead use different global key references). In particular, when the applications use different key references, it is impossible to pass a user verification step during ISIM initialization, thus rendering access to the IMS network impossible.

It further appreciates that, currently, there is no way to request the number of remaining PIN entries for the ISIM, to activate or deactivate the PIN check on the ISIM or to change the PIN or other passwords of the ISIM.

That is, the present disclosure recognizes that existing command protocols for communicating between a host and a modem, such as communication based on AT commands, are ill-equipped to handle a scenario in which a UICC contains multiple applications secured by different PIN codes (e.g. which use different global key references). The disclosure proposes various modifications and extensions to existing command set structures which are described in detail below.

First, a content in which embodiments can be usefully deployed will be described with reference to FIG. 1. FIG. 1 is a schematic illustration of a communication system, generally denoted by reference numeral 100. It will be understood that in FIG. 1 only sufficient elements of the system are shown in order to present the context of some of the arrangements of the disclosure.

The communication system 100 comprises a wireless communications device termed user equipment (UE) 102. The user equipment 102 may be a mobile telephone, a personal digital assistant (PDA), a computer or any other device that exchanges data wirelessly. The UE 102 is in communication with first and second communication networks 106a and 106b. The first network 106a is a 3G UMTS communication network and the second network 106b is an IMS (IP Multimedia Subsystem Network).

The UMTS network 106a comprises a UMTS Terrestrial Radio Access Network (UTRAN) 205 and a core network 208. The UTRAN 205 comprises one or more radio network sub-systems 210a, 210b. A radio network sub-system is a sub-network within the UTRAN 205 and comprises a base station 204 (termed node-B) and a radio network controller (RNC) 206. A node-B 204 is a transceiver which sends and receives wireless signals and defines a cell region. A RNC 206 is the network element responsible for the control of the radio resources of the UTRAN 205. A dedicated physical channel is established between the UE 102 and the node-B 204 to allow data communication to take place there between. It will be appreciated that a plurality of UEs and radio network sub-systems may be present in the UTRAN 205, which for clarity purposes are not shown. The UTRAN 205 is in communication with the core network 208.

The structure of a UMTS network 106a as illustrated in FIG. 1 is well-known to one skilled in the art, and the further operation of such a system is not described herein.

The IMS network 106b comprises a SIP ("Session Initiation Protocol") proxy 302 and application servers 304. The IMS network 106b is for delivering IP ("Internet Protocol") multimedia services to the UE 102. The IMS network 106b is largely built on IETF ("Internet Engineering Task Force") protocols such as SIP. The SIP proxy 302 is a first point of contact between the UE 102 and the IMS network 106b. The application servers 302 execute service code for delivering multimedia services to the UE 102. The UE 102 may access the IMS network 106b via the UMTS network 106a, or alternatively the UE 102 may access the IMS network 106b via a different intermediary network (not shown) such as an IP-based network (e.g. a WiFi network such as a public WiFi network which may or may not be operated by the same operator as the network 106a). For instance, the IMS network 106b may be configured to allow seamless roaming between a public WiFi networks and the UMTS network 106a (that is, such that the UE can switch between accessing the IMS network via the UMTS network 106a and accessing it via the WiFi network in a manner that is transparent to a user of the device).

As explained below, the present subject matter has particular applicability in the case where the UE 102 does not utilize the UMTS network 106a to connect to the IMS network 106b but can nevertheless be usefully deployed both when the UE 102 connects to the IMS network 106b via the UMTS network 106a and when the UE 102 does not connect to the network 106b via the UMTs network 106a and instead connects via some intermediary mechanism.

Although only one SIP proxy 302 and two application servers 304 are shown in FIG. 1, it will be appreciated that the IMS network 106b may comprise many more proxies and servers as well as other network elements.

FIG. 2A is a schematic block diagram of an example configuration of user equipment 102. As shown in FIG. 2A the user equipment 102 comprises host terminal 2 and a modem 4. The host terminal 2 may be a user terminal, and may for example take the form of a desktop computer, laptop computer, tablet style computer, or mobile phone (which may be referred to as a "smart phone"). As shown in FIG. 2A, the modem 4 may for example take the form of a dongle for plugging into the host terminal 2 such that the modem 4 is connected to a host processor 30 (otherwise referred to as an application processor) of the host terminal 2. Alternatively the modem 4 may take the form of a mobile phone handset which, as well as being a conventional mobile telephone, can be connected to the host terminal 2 so as to act as an external cellular modem for the host terminal 2. As shown in FIG. 2A, the modem 4 may be external to the host terminal 2 in that it is a separate unit housed in a separate casing, but which is connected or connectable to the host processor 30 of the host terminal 2 by means of a wired or wireless connection (as well as being removable or being able to be disconnected from the host terminal 2).

FIG. 2B is schematic block diagram of another example configuration of user equipment 102. As shown in FIG. 2B, the modem 4 may be internal to the host terminal 2, e.g. taking the form of a wireless module in the host terminal 2. For example, both the modem 4 and host processor 30 may be housed within the same casing of the host terminal 2. For example the modem 4 may be internal to a mobile phone 2, and connected to the host processor 30 of the mobile phone 2 by way of a wired connection.

In the configuration of FIG. 2A, the casing of the modem 4 is configured to mechanically support a removable UICC 40. In the configuration of FIG. 2B, the casing of the terminal 2 is similarly configured to support the UICC 40.

The UICC is in the form of a removable "smart card"—that is, a plastic (or similar) card containing embedded integrated circuits and electrical connectors for connecting to corresponding electrical pins embedded in the casing of the modem/terminal. The connectors and pins constitute respective interfaces of the UICC and the terminal/modem (see below). The casing of the modem/terminal supports the UICC by way of a card slot configured to mechanically support the UICC to maintain a respective electrical connection between each connector of the UICC and its corresponding pin embedded in the modem/terminal casing.

Figure 3:
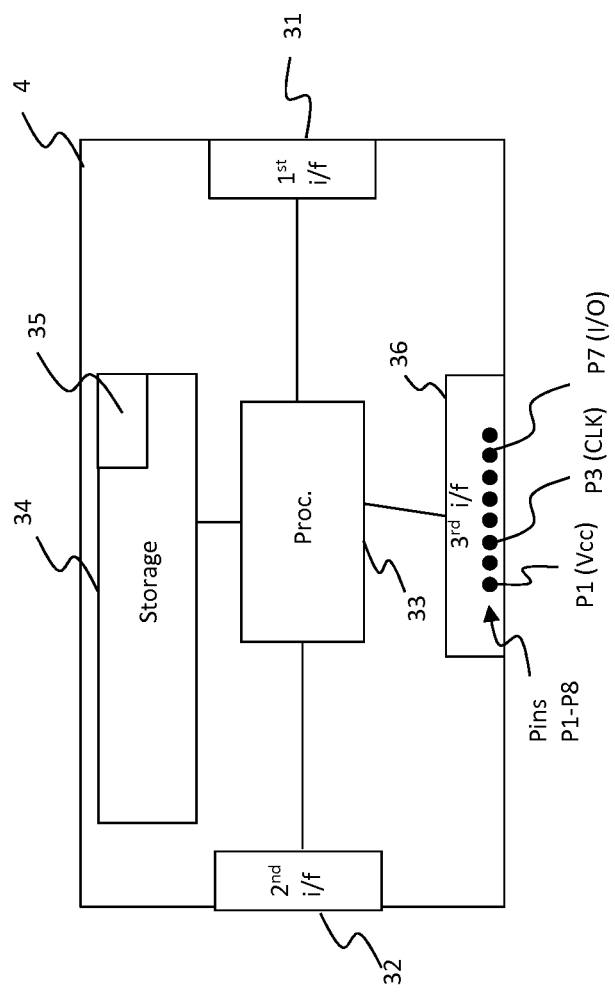
FIG. 3 is a schematic block diagram of a modem.

FIG. 3 is a schematic illustration of a modem. Referring to FIG. 3, the modem 4 comprises a processor 33 and, operatively coupled to the processor 33, a non-transitory computer-readable storage medium 34 such as a magnetic or electronic memory storing soft-modem code. The code on the storage medium 34 is arranged to be executed on the processor 33 and to perform operations of the modem 4 as discussed below. However, the possibility of some or all of the modem functionality being implemented in dedicated hardware is not excluded. The storage medium 34 is also operable to store data on which that code operated, such as data received via the first interface from the Node-B.

The modem 4 comprises a first interface 31. With reference to FIG. 2A, the first interface may comprise a wireless transceiver, typically in the form of a radio frequency (RF) transceiver and an antenna 5 for receiving and transmitting electromagnetic signals over-the-air between the UE and the UMTS network 106a. The first interface of the modem 4 connects via Node-B 204 enabling the modem 4 to establish a channel between itself and the UTRAN 205. With reference to FIG. 2B, the first interface may comprise a wired connection to an interface on the host terminal. The interface on the host terminal may comprise a wireless transceiver, typically in the form of a radio frequency (RF) transceiver and an antenna 5. The interface on the host terminal 2 connects via Node-B 204 enabling the modem 4 to establish a channel between itself and the UTRAN 205.

The modem 4 communicates with the UTRAN 205 in accordance with multi-layered a radio interface protocol architecture, details of which are well known in the art.

The modem 4 also comprises a second interface (host interface) 32 for connecting to the host processor 30 on the host terminal 2. With reference to FIG. 2A, the second interface 32 between the host processor 30 and modem 4, could for example comprise a wired connection such as USB, or a short-range wireless transceiver such as an infrared connection or a radio frequency connection (e.g. Bluetooth). With reference to FIG. 2B, the second interface 32 between the host processor 30 and modem 4, could for example comprise a wired connection within the host terminal 2. Communication between the modem 4 and the host 30 via the second interface 32 is effected at least in part by the host 30 instigating AT (ATtention) commands to the modem 4 via the second interface 32. This is discussed in further detail below.

The modem 4 also comprises a third interface (UICC interface) 36 for connecting to the removable UICC 40. The interface 36 comprises eight electrical pins (P1-P8) (corresponding to eight connectors C1-C8 of the UICC) in the example of FIG. 3, but may alternatively comprise more or fewer pins. As discussed, the pins are embedded either in the modem casing (FIG. 2A) or terminal casing (FIG. 2B) for connection to the corresponding respective connectors C1-C8 of the UICC 40. Each electrical pin has a distinct function. In particular, a first pin P1 proves a supply voltage Vcc to the UICC for powering the UICC, a third pin P3 provides a clock signal CLK for clocking the UICC, and a seventh pin P7 supplied data and receives data from to the UICC 40.

Figure 4:
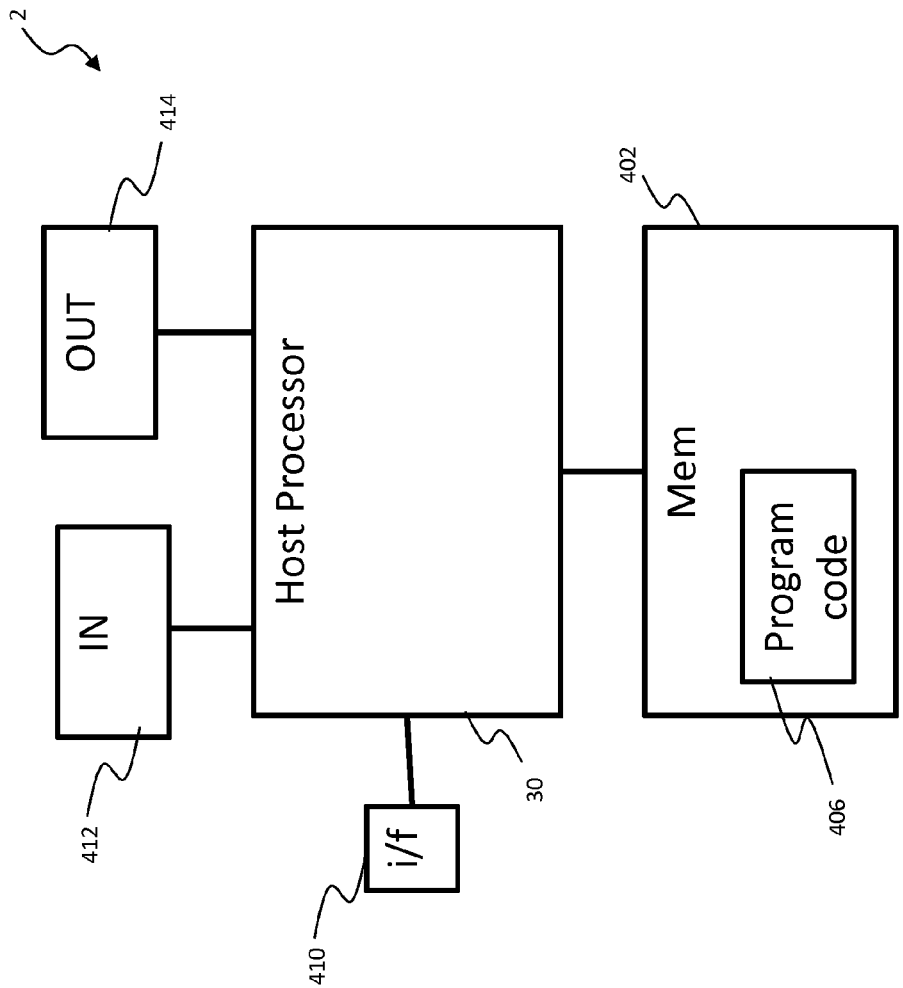
FIG. 4 is a schematic block diagram of a terminal.

The modem 4 may comprise additional interfaces not shown in FIG. 4. For instance, the modem may comprise a fourth (network) interface (not shown) for connecting to an IP-based network (e.g. a WiFi network). In this case, the modem may access the IMS network 106b either via the UMTS network 106a (using the first interface) or via the WiFi network (using the fourth interface).

A single communication channel is established between the host and the modem via the host interface which carries both commands to be interpreted by the modem and data to be transmitted by the modem via the second interface.

For this reason, the modem 4 can operate in different modes. One mode is command mode wherein data received via the host interface 31 is treated as characters, e.g. ASCII coded characters, of a command, each command being a directive to the modem (in this case, a directive to software running on the modem processor 33) to perform a high-level task specified by that command. The high-level tasks include, for example, tasks of dialing a telephone number specified in the command, hanging up a call, UICC PIN-related tasks such as those discussed above. In the command mode, a received string of characters is parsed by the modem (that is, by software running on the modem) to interpret that string i.e. translate it into low level operations to be carried out by the modem in order to perform that task. In particular, where a string of characters received via the host interface commences with character "A" (or "a") followed by character "T" ("t"), the modem 'knows' to interpret this as an ATtention command (or collection of ATtention commands) and to carry out the necessary operations to perform the high-level task identified by the remaining characters of the string (e.g. where the remaining characters "are +CPIN?" the modem knows to interpret this as a command to perform operations to obtain a PIN status of the UICC 40, and performs those operations accordingly in response).

The second mode is a data mode wherein any data received via the host interface 31 is not interpreted as commands to the modem but instead is treated as transmission data second interface 32 for transmission. The modem enters the data mode from the command mode immediately after it has established a connection via the second interface 32, that connection being established responsive to a command (string of characters) received in the command mode, and returns to the command mode e.g. when that connection is terminated.

The terminal 2 is shown in further detail in FIG. 4. As shown, the terminal 2 comprises the host processor 30 to which is connected memory (computer storage) 402, a modem interface 410, one or more input devices 412 and one or more output devices 414. The modem interface 410 is for connecting to the modem via the corresponding interface 31 of the modem. The interface 410 (of the host) and the interface 32 (of the modem) are of the same type (e.g. USB, wireless, hardwired etc.). The host is operable to receive user inputs from a user of the terminal 2 via the input components 412 (which may comprise one or more of a touchscreen, camera, keypad, microphone etc.) and to output information to a user via the output components 414 (which may comprise one or more of a display screen e.g. the touchscreen, loudspeaker etc.). The user inputs that can be received by the host 30 include PIN codes which may be e.g. entered by the user on a touchscreen or keypad for supplying to the UICC 40 via the modem 4.

The memory 402 holds program code for execution on the host processor 30 such as operating system code for managing hardware resources of the terminal 2 and one or more software application for performing useful tasks above and beyond the mere running of the terminal 2. This includes program code operable when executed to instigate various AT commands to the modem via the interface 410. In this way, the host 30 controls operation of the modem 4. The UICC 40 is not directly accessible to the host 30 but the host 30 can instruct the modem 4 to obtain information from/supply information to the modem 4 by instigating appropriate AT commands, such as the various known PIN-related At commands mentioned above but also extended and/or modified AT command in accordance with the present disclosure which are discussed in further detail below.

Figure 5:
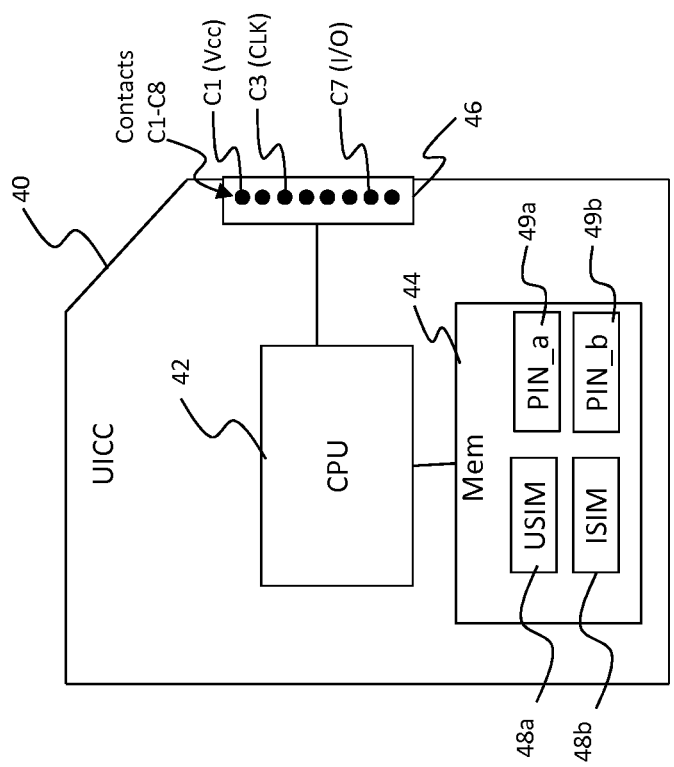
FIG. 5 is a schematic block diagram of a subscriber identity device.

FIG. 5 is a schematic illustration of a UICC (smart card) 40. As shown in FIG. 5, the integrated circuits of the UICC comprise a CPU ("Central Processing Unit") or processor 42, memory (computer storage) 44 and an interface 46 for connecting to the modem 4. The memory may comprise different types of memory such as a combination of ROM, RAM, and EEPROM. The memory holds two subscriber identity applications 48a, 48b for accessing different communication networks according to different radio access technologies (RATs). The memory also holds two separate pieces of user authentication data 49a and 49b which is PIN code data (PIN data) in this embodiment. The PIN data 49a is associated with the USIM application 48a and is for a first global PIN, "PIN_a" (having a first global key reference). The PIN data 49b, which is separate from the PIN data 49a, is associated with the ISIM application 48b and is for a second global PIN, "PIN_b" (different from the first global PIN and having a different global key reference). Before the USIM application 48a can be accessed, a user of the terminal 102 must correctly enter the first global PIN (PIN_a); that is, access to the USIM application is gained by matching the entered PIN to the first PIN data 49a. Before the ISIM application 48b can be accessed, a user of the terminal 102 must correctly enter the second global PIN (PIN_b); that is, access to the ISIM application is gained by matching the entered PIN to the second PIN data 49b.

The UICC is an example of a subscriber identity device operable to execute (on the CPU) at least two subscriber identity applications (USIM 48a, ISIM 48b).

As described in the Background section above, before the terminal 102 can access the UMTS network 106a, it must complete an initial authentication procedure. This procedure is performed, in part, by the USIM application 48a when executed on the processor 42 and thus cannot be completed before the first PIN (PIN_a, matching the first PIN data 49a) is delivered to the UICC via the interface 46 by the modem 4. Similarly, before the terminal 102 can access the IMS, it must complete a separate authentication procedure. This separate authentication procedure is performed, in part, by the ISIM application when executed on the processor 42 and thus cannot be completed before the second PIN (PIN_b, matching the second PIN data 49b) is delivered to the UICC via the interface 46 by the modem 4.

As also indicated above, the UICC 40 is operable to store various information about both the first (USIM) PIN and the second (ISIM) PIN. For each of the two PINs, this includes information about whether or not that PIN has been delivered correctly (and therefore whether or access to the corresponding application granted) e.g. whether the PIN is in a "READY" or "SIM PIN" state, whether or not that PIN is locked e.g. in a "SIM PUK" state (that is, whether or not a Pin Unlock Code (PUK) is required before any further input PINs will be accepted e.g. due to that PIN being entered incorrectly too many times—see above). This information also includes information about the number of remaining failed attempts for that PIN (that is, the number of times that PIN can be entered incorrectly sequentially before that PIN is locked). This information is separate and independent for the two PINS i.e. the state of the first PIN is separate from, and may be different from, the state of the second PIN (e.g. one may be "READY", the other may be "SIM PIN" or "SIM PUK"); further the number of remaining failed attempts may be different for each—that is, separate counters recording how many failed attempts remain are separately and independently maintained for each of the first and second PINs, and thus the first and second PINS may be locked independently of one another.

Communication between the modem 4 and the UICC 42 is based on the Standardized specifications and is described, for instance, in ETSI TS 102 221, "Smart Cards; UICC-Terminal interface; Physical and logical characteristics". At the physical level, commands to the UICC are delivered to connector C7 of the UICC (from pin P7) as 10 bit characters, each bit encoded as one of a high or low voltage on the connector 7, constituting 8 data bits, 1 start bit (which always has the same value—one of high or low), and 1 even parity check bit. Characters are supplied in character frames starting with the start bit, followed by the data bits starting with the most significant data bit, and ending with the parity bit. Successive character frames are separated by guard intervals. See e.g. section 7.2.1. of TS 102 221.

In particular, the modem 4 can instigate various commands to the UICC 40 to obtain respective information about both the first PIN (that is, information pertaining to the first PIN data 49*a*) and about the second PIN 49*b* (that is, information pertaining to the second PIN data 49*b*). Existing communication protocols for communication with the UICC allow for information about a specific, identifiable PIN (e.g. one of the first (USIM) PIN (PIN_a) and the second (ISIM) PIN (PIN_b)) to be obtained from the UICC via the interface 46 by the modem 4. This is performed by the modem 4 first checking which applications are supported by the UICC 40 by using information stored in the UICC's EF-DIR file (application directory). When the modem 4 executes a SELECT command for a respective one of these applications, the modem 4 requests the selected application to return its Level 1 PIN status e.g. one of the "READY", "SIM PIN" or "SIM PUK" statuses. Each selected application can report a different status for which PIN is needed, or the status can be the same for two or more of the selected applications.

However, as indicated above, the present disclosure recognizes that the same is not true of existing communication protocols between the modem 4 and the host processor 30 e.g. the same is not true of communication based on the exchange of AT commands between the modem and the host. Whilst existing AT commands enable the host processor 30 to instruct the modem 4 to obtain information about a UICC PIN, these assume that a single PIN is implemented at the UICC and thus provide no mechanism for identifying one of multiple possible PINS implemented at the UICC. Thus, whilst existing protocols enable the modem 4 to obtain information related to a selected one of multiple PINS from the UICC, the host processor currently 30 has no mechanism by which it can request that the modem 4 do so.

The present disclosure recognizes two general possibilities ways of rectifying this. A first is to extend existing AT commands with special parameters for the ISIM application, and the second is to introduce new AT commands that are dedicated to the ISIM application.

Figure 6:
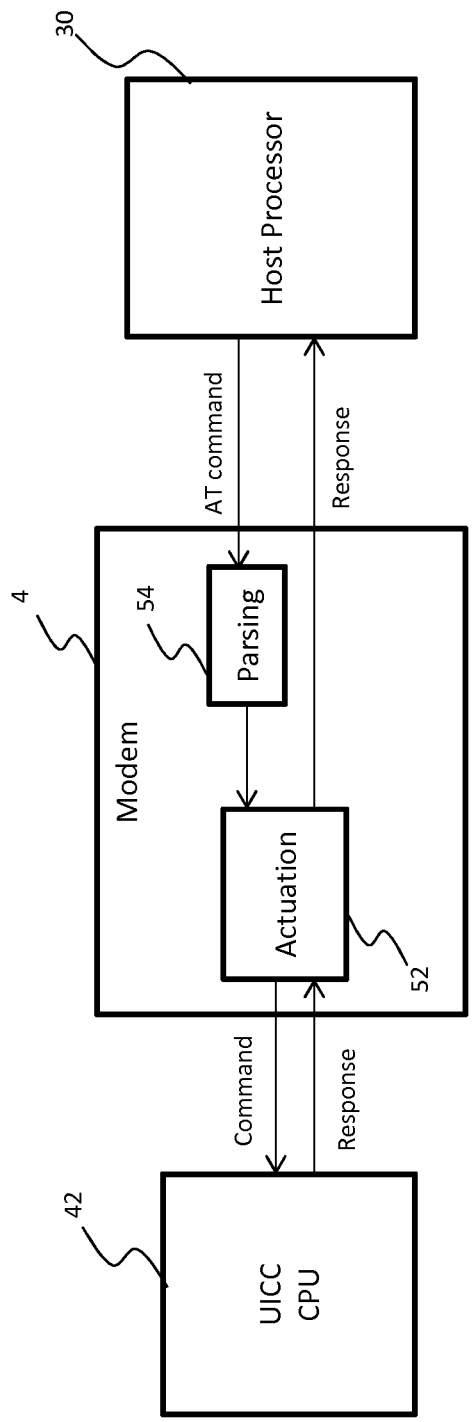
FIG. 6 shows a functional block diagram of a part of a modem.

FIG. 6 illustrates schematically a mechanism for both modem-UICC communication and host-modem communication in accordance with the present disclosure. FIG. 6 shows the modem as comprising an actuation component 52 and a parsing component 54. The components 52, 54 are logical entities representing respective functionality implemented by the modem when operating in the command mode, that functionality being implemented in software executing code 35 on the processor 33 of the modem 4 (but which, in alternative embodiments, could be represented in hardware, firmware or a combination of software, hardware and/or firmware).

When the modem 4 is operating in the command mode, the parsing component 42 receives a command as a character string (e.g. as a string of ASCII characters) from the host 4 via the host interface 32 (on the communication channel between the modem and the host) and parses that commands to match it to a corresponding high-level task to be performed by the modem. In particular, the parser is operable to parse one or more extended and/or modified PIN-related AT commands (detailed below) to identify a corresponding PIN-related task, each PIN-related task being a task of actuating a particular corresponding PIN activity by the UICC. Notably, the modified/extended AT commands have an attribute that act to identify at least one particular PIN of the UICC out of multiple possible pins (e.g. one or more of the USIM PIN or ISIM PIN), the identity of that PIN also being revealed by the parsing.

For instance, a PIN-related task may be one of obtaining a PIN status, obtaining information about how many PIN retires are permitted, entering a PIN, changing a PIN etc. Each of those PIN tasks can be performed in relation to at least one Pin identified by the corresponding command (e.g. by obtaining the PIN status of the identified pin, by entering the identified PIN, by changing the identified PIN etc.).

The attribute identifying the command may be one or more specific characters which act to identify that PIN. These may be character(s) of a command "parameter" and/or character(s) of an AT command "preamble". "AT command" is used in the present context to include known AT commands and also the extended/new commands detailed herein below. An AT command of the form "*" where "*" represents a string of one or more characters other than "=" has no parameters, only a preamble "*"; a command of the form "*=**", where "*" represents a first string of one or more characters other than "=" and "**" represents a second string of one or more characters other than "=", has a preamble "*" and one or more parameters represented by "**" and the UICC can be identified either by "*" or "**" (or both). As used herein, two commands having different preambles are considered different types of commands. Two commands having the same preamble are considered the same type of command irrespective of the parameters. As an example and as described in more detail below, in the present disclosure, an existing AT command can be extended by adding an extra parameter to it so that a USIM PIN code and an ISIM code can be entered simultaneously e.g. "AT+CPIN=<pin>,<pin_b>". Alternatively, a new ISIM-specific AT command may be generated in parallel with a known AT command, whereby the ISIM-specific AT command carries an extra character to distinguish it over the (USIM) AT command e.g. AT+CIPIN or AT+ICPIN. The newly generated AT command could also be completely new and unrelated to the known (USIM) command, i.e. a different type of command altogether.

The actuation component 52 is for actuating PIN activities by the UICC relating to a particular identified PIN (or particular identified PINS) of the UICC (e.g. first USIM PIN, second ISIM PIN) responsive to the commands (new/modified AT-type commands in this embodiment) from the host 30. The parsing component 42 indicates both an identified high-level modem task, and a particular UICC PIN in relation to which that task is to be performed, to the actuation component, which the actuation component 52 translates into low-level operations to be carried out by the modem processor 33 in order to actuate the corresponding PIN activity in relation to the identified UICC PIN. For instance, the task may be one of determining how many times the identified PIN can be entered incorrectly before that PIN is locked; in this case, the PIN activity by the UICC is one of providing that information.

An "AT command" can thus be characterized conceptually as a one-line computer program in a high-level, human readable command language (defined by the Hayes command set) that ultimately needs to be translated into a sequence of low-level processor operations to be carried out by the modem processor 33—see e.g. International Telecommunication Union (ITU-T) Rec. V.250 (07/2003). In this example, the AT command is delivered to the modem 4 in its high-level form for translation thereby.

As discussed, the disclosure considers in particular a situation in which there are different global key references used by the USIM and ISIM applications. The actuator 52 can be configured responsive to one or more of the extended AT commands and/or one or more of the new AT-type commands mentioned below to actuate the UICC CPU 42 via the UICC interface 36 to perform a corresponding PIN-related task in relation to one (or more) of multiple PINs identified by an attribute of the modified/new AT command.

The disclosure provides the following extended and new PIN-related AT commands, each identifying a corresponding PIN-related task to be performed by the modem. One or more of the commands listed below may be received by the modem in the command mode and parsed 1) to identify the corresponding PIN-related task to be performed by the modem and, notably, 2) to identify one or more UICC PINS out of multiple UICC PINS in relation to which that task is to be performed.

1) In accordance with the present subject matter, the ISIM PIN may be entered in one of two ways under control of the host 30 when the USIM and ISIM use different PINS e.g. If when they use different global key references to one another:

1.1) After the modem 4 receives the "AT+CPIN?" AT command inquiry, the "<code>" parameter of the "+CPIN:" response generated by the modem 4 can be extended by adding an extra parameter to it, and/or modified by using an ISIM-specific <code> parameter, to indicate that the ISIM PIN is needed. The disclosure notes that, if the ISIM and the USIM application start up in parallel, both PINs are needed at the same time. An alternative would be that the USIM PIN is always entered before the ISIM PIN. In either case the <code> parameter of one or more "+CPIN:" response(s) would need to indicate multiple needed PIN code statuses e.g. to indicate one of a READY, SIM PIN, or SIM PUK status for each of multiple PINs. The following examples provide several ways that this can be done:

A) Another <code> parameter is added to the response: "+CPIN: <code>, <code _b>". In embodiments, the first parameter "<code>" is always for the USIM PIN code status and the second parameter "<code_b>" is always for the ISIM PIN code status. In this case, because the second parameter "<code_b>" is always associated with the ISIM application, a new ISIM-specific parameter value, "ISIM_PIN" is not required. Thus the response to the "AT+CPIN?" command inquiry is: "+CPIN: SIM_PIN, SIM_PIN". In this way, the USIM is seen to be prioritized over the ISIM so that the USIM PIN gets entered before the ISIM PIN.

B) Only one <code> parameter is used in a response. So the modem 4 first returns a usual "+CPIN: SIM_PIN" response to the host 30 to indicate that USIM PIN is needed. The host 30 then sends the usual "AT+CPIN=<pin>" command to enter the USIM PIN to the modem 4. Then afterwards, another "AT+CPIN?" command inquiry is made by the host 30 for which the modem 4 then uses a new ISIM-specific <code> parameter value, "ISIM_PIN", as part of an additional response to indicate that the ISIM PIN is now needed i.e. after the USIM PIN code status has been indicated and the USIM PIN entered. Thus the response to this second "AT+CPIN?" command inquiry is: "+CPIN: ISIM_PIN". In this way, the USIM is seen to be prioritized over the ISIM so that the USIM PIN gets entered before the ISIM PIN.

C) Similar to the first example, another <code> parameter is added to the response: "+CPIN: <code>, <code _b>". However the second parameter "<code_b>" uses the ISIM-specific <code> parameter value, "ISIM_PIN". Thus the response to the "AT+CPIN?" command inquiry is: "+CPIN: SIM_PIN, ISIM_PIN".

D) Two responses, a first line and a second line, are generated in response to a single "AT+CPIN?" AT command inquiry.

i) The second line can always be associated with the ISIM application, so that an ISIM-specific parameter value, "ISIM_PIN" is not required. Thus the two-line response to the "AT+CPIN?" command inquiry is:
+CPIN: SIM_PIN
+CPIN2: SIM_PIN ii) Alternatively, the second line does use the ISIM-specific <code> parameter value, "ISIM_PIN". Thus the two-line response to the "AT+CPIN?" command inquiry in this case is:
+CPIN: SIM_PIN
+CPIN2: ISIM_PIN Then, based on the type of response(s) received, the host 30 generates one or more "AT+CPIN= . . . " AT command(s) as appropriate for entering the USIM and ISIM PINs. That is, in order to differentiate if an input PIN <pin> is intended for the USIM or the ISIM, the generated "AT+CPIN=<pin>" command can be extended by adding an extra parameter to it, and/or modified by using an ISIM-specific <pin> parameter, similar to the technique seen in the received "+CPIN:" response.

So for the above examples A) to D), the host 30 generates the following "AT+CPIN= . . . " AT command(s) for entering the PINs:

A) "AT+CPIN=<pin>,<pin_b>. Here the "<pin>" parameter represents the USIM PIN and the "<pin_b>" parameter represents the ISIM PIN.

B) Based on the additional response, the host 30 generates the command "AT+CPIN=<pin>", where the "<pin>" parameter represents the ISIM PIN.

C) "AT+CPIN=<pin>,<pin_b>. Here the "<pin>" parameter represents the USIM PIN and the "<pin_b>" parameter represents the ISIM PIN.

Di) Based on the two responses, the host generates two lines of corresponding "AT+CPIN=" commands:
AT+CPIN=<pin>
AT+CPIN=<pin_b>

Dii) Based on the two responses, the host generates two lines of corresponding "AT+CPIN=" commands:
AT+CPIN=<pin>
AT+CPIN=<pin_b>

Another way to ensure that the USIM PIN is entered before the ISIM PIN is by modem 4 including an extra parameter indicating a <SIM> or <ISIM> string as part of the "+CPIN" response whereby the parameter is configured to indicate USIM before ISIM. By identifying the type of application (i.e. either USIM or ISIM application) in a response, a corresponding parameter can be added to the AT command for entering the PIN codes: e.g. AT+CPIN=<pin>, <SIM>. In this case the host 30 specifically provides the PIN code for the USIM application. This can be followed by an AT+CPIN=<pin>,<ISIM> command for entering the ISIM PIN code.

Alternatively an <application ID> parameter can be used as an extra parameter indicating a specific application ID as part of the "+CPIN:" response, instead of the <SIM> or <ISIM> parameters. The <application ID> parameter specifically identifies an individual application for which the PIN code is needed and to be entered for. This can be advantageous if there are multiple USIM applications and/or multiple ISIM applications running on the UICC, as the <application ID> will distinguish between all of the applications. Thus a corresponding "AT+CPIN=<pin>,<application ID>" command is generated by the host 30, which identifies the specific one of applications for which the PIN is to be entered. This cycle is repeated as many times as necessary for the other application(s) requiring an appropriate USIM PIN code or ISIM PIN code. Because the <application ID> parameter distinguishes between all of applications, applications can be handled independently and so there is no requirement to prioritize USIM over ISIM.

1.2) As an alternative to the extending and/or modifying of parameters in 1.1, a parallel AT-command for giving the ISIM PIN code could be used. For example, the host 30 can send to the modem 4 an "AT+ICPIN?" command inquiry specifically directed to the ISIM, in parallel with a regular "AT+CPIN?" command inquiry directed to the USIM (as described above). In response to the "AT+ICPIN?" the modem 4 sends returns a status response e.g. "+CPIN: SIM PIN". Note that the <code> parameter does not need to specify that an ISIM PIN is needed. This is because the host 30 that originally instigated an "AT+ICPIN?" command inquiry, and will therefore know that if a PIN code is needed, then it will be the ISIM PIN that is needed. Therefore in this example, the host 30 will send to the modem 4 a command of the form "AT+ICPIN=<pin>" for entering the ISIM PIN (while the known "AT+CPIN=<pin>" command being reserved for the USIM). This applies particularly (but not exclusively) when the ISIM application start-up is completely independent from the USIM, e.g. in a scenario where IMS services are gained via a (e.g.) WWI network and not the UMTS network 106a i.e. without the need to start up the USIM to gain access to the ISM network 106b via the UMTS network 106a (see above).

2) There are two possibilities for requesting the remaining ISIM PIN entries (that is, the number of time the ISIM PIN can be entered incorrectly sequentially before the ISIM PIN is locked):

2.1) Similar to 1.1 above, the "<code>" parameter of the "+CPINR:<code>" response to the "AT+CPINR" command is extended to indicate also the remaining pin code checks for the ISIM application. In one example, new ISIM-specific parameters may be added to the response: "+CPINR: ISIM PIN,<retries>,<default_retries>".

2.2) Similar to 1.2 above, a dedicated AT command for the ISIM is introduced to check the remaining PIN code checks for the ISIM application. This could be named "AT+ICPINR" and could have similar parameters as the "AT+CPINR" command.

3) There are two possibilities for activating and deactivating the ISIM PIN code:

3.1) The "<fac>" parameter (see Background section above) of the "AT+CLCK" command is extended to indicate that the PIN of the ISIM is about to be activated or deactivated. "IC" for "ISIM code" could be used. That is, the possible values <fac> can take (listed above) can be extended to include "IC" in addition to the existing possible values.

3.2) Similar to 1.2 above, a dedicated AT command for the (de)activation of the ISIM PIN check is employed. This could be named "AT+ICLCK" and have similar parameters as the AT+CLCK command, including a <mode> parameter with <mode>=0 enabling the ISIM PIN check, <mode>=1 disabling the ISIM PIN check, and <mode>=2 querying whether or not the ISIM PIN check is currently enabled or disabled.

There are two possibilities for changing the ISIM PIN code:

4.1) Similar to 3.1, the "<fac>" parameter of the "AT+CPWD" command is extended to indicate that the PIN of the ISIM is about to be changed. Again, "IC" for "ISIM code" could be used.

4.2) Similar to 3.2, a dedicated AT command for changing the password of the ISIM is used. This could be named "AT+ICPWD" and have similar parameters as the AT+CPWD command, the new parameters comprising <oldpwd> and <newpwd> wherein <newpwd> is used to indicate a new desired ISIM PIN, and <oldpwd> must take the value of the current ISIM PIN to effect the change to the new desired ISIM PIN.

It is noted that, for LTE the access to the IMS network is essential to provide similar CS services as in 2G and 3G. If the ISIM application can't be started up because a different global key reference is used, it won't be possible to gain access to it. Thus, as noted, the present subject matter has particular (but not exclusive) applicability to a scenario in which a single UICC provides access to an LTE IMS network in addition to one or more other 3G (or 2G) networks by way of respective ISIM and USIM (or SIM) applications respectively.

It is noted that the extended/new AT commands could be employed particularly (but not exclusively) to improve exiting host-modem communications based on 3GPP TS 27.007 (AT command specification).

It will be appreciated that the above embodiments have been described only by way of example, and other variants or applications may be apparent to a person skilled in the art given the disclosure herein.

For instance, while embodiments above have been described in relation to certain standards such as 3GPP UMTS networks and so forth, these are not intended to be limiting and the present disclosure may in fact be applied within any communication standard of any communication network. For instance, the subject matter could be applied equally to a situation where a UICC provides an ISIM application for LTE IMS access and a SIM application for 2G access (as an alternative or in addition to a USIM application for 3G access). Moreover, the subject matter can also be employed in non 3GPP systems, both standardized and non-standardized.

Further, although the above has been described in terms of a substantially soft modem implementation, other implementations where more or even all of the described functions (e.g. that of the actuation component 52) are implemented in dedicated hardware are not excluded.

Those skilled in the art to which this application relates will appreciate that other and further additions, deletions, substitutions and modifications may be made to the described embodiments.

What is claimed is:

1. A modem for use at a terminal for accessing first and second communication networks, the modem comprising:
   a device interface for connecting to a subscriber identity device, the subscriber identification device comprising:
   computer storage storing first and second subscriber identity applications, and first and second pieces of user authentication data, separate from one another, for effecting independent first and second user authentication procedures for the first and second applications respectively; and
   a processing unit operable to execute the first application to provide access to the first network when the first authentication procedure has been completed, and to execute the second application to provide access to the second network when the second authentication procedure has been completed;
   wherein the modem further comprises:
   a host interface for connecting to a host processor of the terminal; and an actuation component configured responsive to an authentication command received via the host interface and having an attribute identifying at least one of the first and second pieces of user authentication data to actuate the processing unit of the subscriber identification device to perform an authentication task in relation to the identified user authentication data, wherein the authentication command has a parameter identifying one of the first and second pieces of user authentication data and has a preamble which does not identify either of the first and second pieces of user authentication data.

2. A modem according to claim 1 wherein the actuation component is configured responsive to a first authentication command to actuate the processing unit to perform an authentication task in relation to the first authentication data, and responsive to a second authentication command different form the first and having an attribute identifying the second authentication data to perform that same authentication task but in relation to the identified second authentication data.

3. A modem according to claim 2 wherein the first command is received as a first string of characters and the second command is received as a second string of characters, the second string of characters being the same as the first string of characters but for at least one additional character not present in the first string, the at least one additional character being the attribute identifying the second authentication data.

4. A modem according to claim 3 wherein the at least one additional character forms part of a preamble of the second command.

5. A modem according to claim 1 comprising a parsing component configured to receive the authentication command as a string of characters and to parse those characters to map the received command to a modem task to be performed by the modem, the actuation component being configured to perform the modem task by actuating the processing unit to perform the authentication task.

6. A modem according to claim 5 wherein the parsing component is configured to perform said parsing to identify the at least one of the first and second pieces of user authentication data, the actuation component being configured to perform the authentication task in relation to the user authentication data identified by the parsing component.

7. A modem according to claim 6 wherein the first character of the initial string of characters is an "A" or an "a" and the second character of the initial string of characters is a "T" or "t".

8. A modem according to claim 5 wherein the string of characters is received preceded by an initial string of characters, the parsing component being configured to parse the string of characters based on the preceding initial string of characters.

9. A modem according to claim 5 wherein the string of characters is a string of ASCII characters.

10. A method implemented by a modem for use at a terminal for accessing first and second communication networks, the modem comprising a device interface for connecting to a subscriber identity device, the subscriber identification device comprising: computer storage storing first and second subscriber identity applications, and first and second pieces of user authentication data, separate from one another, for effecting independent first and second user authentication procedures for the first and second applications respectively; and a processing unit operable to execute the first application to provide access to the first network when the first authentication procedure has been completed, and to execute the second application to provide access to the second network when the second authentication procedure has been completed, the method comprising:

receiving from the terminal an authentication command having an attribute identifying at least one of the first and second pieces of user authentication data and has a preamble which does not identify either of the first and second pieces of user authentication data; and responsive to receiving the command, actuating the processing unit of the subscriber identification device to perform an authentication task in relation to the identified user authentication data.

11. At least one non-transitory computer readable storage medium storing executable code configured when executed to implement the method of claim 10.

* * * * *